(12) United States Patent
Sukhyani (10) Patent No.: US 12,045,656 B2
(45) Date of Patent: Jul. 23, 2024

(54) CLIENT-DEFINED FIELD RESOLVERS FOR DATABASE QUERY LANGUAGE GATEWAY

(71) Applicants: Atlassian Pty Ltd., Sydney (AU); Atlassian Inc., San Francisco, CA (US)

(72) Inventor: Kapil Sukhyani, Fremont, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 214 days.

(21) Appl. No.: 16/914,402

(22) Filed: Jun. 28, 2020

(65) Prior Publication Data

US 2021/0406078 A1 Dec. 30, 2021

(51) Int. Cl.
 *G06F 9/50* (2006.01)
 *G06F 9/445* (2018.01)
 *G06F 9/54* (2006.01)
 *G06F 16/2455* (2019.01)
 *G06F 16/248* (2019.01)

(52) U.S. Cl.
 CPC ........ *G06F 9/5027* (2013.01); *G06F 9/44505* (2013.01); *G06F 9/546* (2013.01); *G06F 16/24553* (2019.01); *G06F 16/248* (2019.01)

(58) Field of Classification Search
 CPC ............. H04L 61/2528; H04L 67/5621; H04L 41/024; G06F 16/252; G06F 16/25; G06F 16/258; G06F 16/24534; G06F 16/2433; G06F 16/24
 See application file for complete search history.

(56) References Cited

U.S. PATENT DOCUMENTS

| 11,159,634 | B1* | 10/2021 | Deshpande | G06F 9/546 |
| 2013/0173756 | A1* | 7/2013 | Luna | H04L 67/5651 |
| | | | | 709/224 |
| 2015/0026158 | A1* | 1/2015 | Jin | G06F 16/90335 |
| | | | | 707/769 |
| 2021/0248114 | A1* | 8/2021 | Tamjidi | G06F 16/2433 |
| 2021/0248143 | A1* | 8/2021 | Khillar | G06F 16/2379 |

OTHER PUBLICATIONS

A model-driven framework for data-driven applications in serverless cloud computing Samea F, Azam, et al. (2020) A model-driven framework for data-driven applications in serverless cloud computing. Plos One 15(8): e0237317. https://doi.org/10.1371/journal.pone. 0237 (Year: 2020).*
Eeda, Naresh, "Rendering real-time dashboards using a GraphQL-based UI Architecture" (2017). Electronic Thesis and Dissertation Repository. 5136. (Year: 2017).*
Definition and implementation of general-purpose IoT cloud backend, Jesse Juuti 2020 p. 1-48 https://lutpub.lut.fi/handle/10024/161257 retrieved from internet Jul. 20, 2022 (Year: 2020).*

(Continued)

*Primary Examiner* — Tom Y Chang
(74) *Attorney, Agent, or Firm* — Brownstein Hyatt Farber Schreck, LLP (57) ABSTRACT

A query gateway service for servicing API requests of software services, the query gateway service configured to monitor for, and execute, client-defined field resolvers so that client applications can define, at least in part, how data served to that client application in response to an API request is formatted, validated, mutated, or otherwise presented.

12 Claims, 5 Drawing Sheets

(56) References Cited

OTHER PUBLICATIONS

Wieruch, R. (2018). The Road to GraphQL. Independently published. https://www.academia.edu/download/60211738/the-road-to-graphql20190805-118988-1x4nagw.pdf retrieved from internet Apr. 12, 2023 (Year: 2018).*

Subailo, Sahsko (2017) . GraphQL schema stitching. Apollo blog. https://www.apollographql.com/blog/backend/graphql-schema-stitching/ retrieved from internet Apr. 12, 2023 (Year: 2017).*

StepZen GRAPQL doc, all pages https://stepzen.com/docs retrieved from internet retrieved form internet Aug. 4, 2023 (Year: 2018).*

* cited by examiner

CLIENT-DEFINED FIELD RESOLVERS FOR DATABASE QUERY LANGUAGE GATEWAY

TECHNICAL FIELD

Embodiments described herein relate to database systems and, in particular, to a database language query gateway configured to leverage one or more resolver functions, lambda functions, and/or services defined by a client device communicably coupled to that gateway.

BACKGROUND

Database management systems facilitate controlled access to organized data stored in a table of a database. A database language query gateway, such as a server executing an instance of GraphQL, can be used to service higher-order queries of data distributed across multiple database management systems, multiple databases, and/or multiple tables. Conventional database language query gateway services are configured to (1) convert requests for data into multiple discrete queries of different database management systems and (2) to merge results of each query of each database management system into a single response served back to a client device that initiated the original request.

However, the form and format of each field of a response provided to a client device is defined by a predefined "resolver function" specific to each respective field. In this manner, resolver functions of conventional gateway services are, like other methods and classes defining the gateway service itself, immutable once the gateway service is instantiated. As a result, developers and/or managers of conventional database language query gateway services are often required to reconfigure, and thereafter re-instantiate, such services in order to modify or update fields, modify or update field formats, modify or update field validation, and/or to support new or updated database management systems. In other words, even minor modifications to features or functionality of a conventional database language query gateway service requires taking the service offline.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

DETAILED DESCRIPTION

Embodiments described herein relate to systems and methods for facilitating access to structured data stored in one or more databases of a software service. An example of a software service, such as described herein, is a collaboration tool, such as an issue tracking system, an incident response system, a repository service, and so on. In other cases, a software service can be a website or web-accessible platform, such as a social media website, a commerce website, a financial or banking website, and so on. In each example, and others, a software service can be associated with at least one database or database management system that controls access to data stored by, accessible to, or otherwise associated with that software service.

For example, a social media software service may be associated with a database that stores user profile information, another database that stores multimedia information (e.g., photos, videos, and so on), and yet another database that stores connections between different profiles. In another example, a banking or finance software service may be associated with a database that stores account information, another database that stores account balance and transaction information, and yet another database that stores data about individual account holders.

In another example, an issue tracking system software service may be associated with a database that stores user account information (e.g., login credentials, user profile information, and so on), another database that stores issue data, and yet another database that stores role and user group information. For simplicity of description, many embodiments that follow reference an example software service implemented as an issue tracking system or a similar or related collaboration tool, but it may be appreciated that this is merely one example and that the systems and methods described herein can be leveraged by any suitable software service, coupled to and/or associated with any number of databases as may be appropriate.

For these embodiments, more specifically, an end user device (e.g., a personal electronic device, such as a cellular phone or laptop computer) executes a "client application" configured to communicate with a software service, often over the open Internet and/or an Intranet. The software service maintains one or more databases that store data that can be selectively accessed (e.g., queried) by the client application and shown to the user with a graphical user interface rendered on a display coupled to the client device.

In particular, for embodiments described herein, the software service includes a query gateway service that receives application programming interface ("API") requests (including data queries) from one or more client applications. The query gateway service thereafter queries all relevant databases of the software service to answer the API request and generates a single response back to the client application including all requested information formatted and/or presented in a manner expected by the client application.

Custom formatting, retyping, recasting, and/or other enriching or mutating of one or more fields of a response to a client application's API request is performed by the query gateway by leveraging a field-specific resolver for each field and/or field type. A field-specific resolver, or more simply a "resolver," as described herein is a data structure and/or a set of executable instructions that when executed by the query gateway service (or another appropriate server or service configured to execute a resolver, as described herein) causes the gateway service to output a specifically-formatted and specifically-typed result that, in turn, can be packaged into an API response directed from the query gateway service to the client application.

As such, generally and broadly, it may be understood that embodiments described herein reference a client-server architecture in which the server includes a query gateway that exposes a request/response API (e.g., a RESTful API) with which a client application can interact to request data from, and provide data to, a software service.

In addition, for embodiments described herein, the query gateway service is further configured to resolve one or more fields of a response back to a client application with a custom resolver that is not predefined at runtime of the query gateway service. In another non-limiting phrasing, a query gateway as described herein is configured to support custom resolvers defined, in many examples, by a client application.

For example, in many embodiments, an API request communicated from a client application to a query gateway service as described herein can include at least two portions. a first portion containing an API request and a second portion containing a client-defined resolver for at least one field of the API request contained in the first portion. As a result of these constructions, the client application can define, at least in part, how the query gateway responds to requests from the client application.

As one example, a client application may have a localization preference for display of a date that is not supported by a particular software service. In this example, the client application can identify a custom date resolver that formats all dates returned from the query gateway according to the preference of the client application (or, more particularly, an operating user of the client application). As a result of this construction, any time a graphical user interface of the client application displays a date that is received from the software service in an API response, that date can be formatted according to the output of the client-defined resolver. As one example, a social media application may serve, in an API response, a timeline of posts or status messages, each of which may be displayed in a graphical user interface formatted in a manner pleasing to, and defined by, the end-user operating that client application on that particular client device.

In another example, a client application may have a privacy preference that prevents data formatted in a certain manner (e.g., formatted as a social security number) from being communicated from the query gateway at all. In this example embodiment, a client application may identify a custom resolver that automatically redacts, or causes to be redacted, certain data that might otherwise be returned in an API response from the query gateway. In this manner, privacy can be improved and information security can be enhanced on a per-client basis with or without the knowledge of the particular software service from which the client application is requesting data.

In yet another example, a user of a software service may prefer to leverage his or her own encryption services that are separate from those provided by a particular software service. In these examples, a client application can direct a gateway service to forward all fields to a particular trusted encryption/decryption server for resolution. In this example, data stored in databases of the software service may be encrypted against a private key controlled only by an operator of the client application and/or an operator in control of the encryption/decryption service.

The foregoing examples are not exhaustive; a person of skill in the art will readily appreciate that a custom resolver and/or a client-defined or user-defined resolver leveraged by a query gateway service as described herein can confer numerous additional functionalities to an existing exposed API provided by a software service.

More generally, it is appreciated that a system architecture as described herein can leverage user-defined resolvers to modify fields or data returned to a client application in any suitable manner. As described in greater detail below, a user-defined resolver can, in whole or in part, be (1) a lambda function identified by the client application, (2) a server or service provided by the client application itself, (3) executable code transmitted from a client application to a query gateway service, and/or (4) a dedicated server system or software instance, and so on; any suitable user-defined resolver or executable code can be used.

As may be appreciated by a person of skill in the art, a query gateway configured to resolve one or more fields of a particular request in a user-customizable or service-provider customizable manner can enable a query gateway to be substantially more flexible and customizable when contrasted with conventional statically-configured query gateways. These and other embodiments are described herein and it may be appreciated that these constructions can apply to any suitable software service configured to serve, via API requests, one or more responses to a client application (including end-user browser applications rendering a web page) communicably coupled to the software service or a portion thereof, such as a query gateway configured, as noted above, to receive and execute client-defined field resolver(s) to service API requests for structured data from a software service, such as an issue tracking system or another collaborative work tool or environment.

These foregoing and other embodiments are discussed below with reference to FIGS. 1A-3. However, those skilled in the art will readily appreciate that the detailed description given herein with respect to these figures is for explanation only and should not be construed as limiting.

Figure 1A:
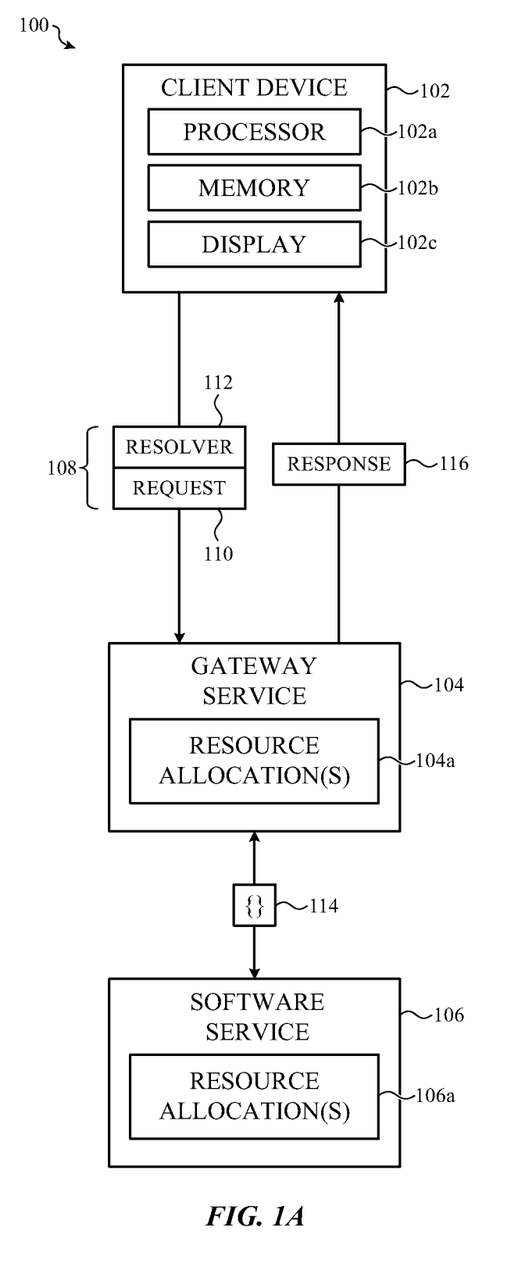
FIG. 1A depicts a simplified system diagram of a database language query gateway service configured to respond to a request from a client device, the request including a client-defined field resolver.

FIG. 1A depicts a simplified system diagram of a system 100 configured to service API requests from a client device 102. In particular, the system 100 includes a gateway service 104 coupled to a software service 106. The gateway service 104 is configured to resolve one or more fields of an API request directed from the client device 102 to the software service 106 by using one or more client-defined field resolvers, such as described herein.

More specifically, in the illustrated example, the software service 106 communicably couples via one or more networking or wired or wireless communication protocols and the gateway service 104 to the client device 102. It may be appreciated that other client devices may be configured in a substantially similar manner as the client device 102, although this may not be required of all embodiments and different client devices can be configured differently and/or may transact data or information with, and/or provide input(s) to, the software service 106 in a unique or device-specific manner.

The client device 102 can be any suitable personal or commercial electronic device and may include, without limitation or express requirement, a processor 102a, volatile or non-volatile memory (identified, collectively, as the memory 102*b*), and a display 102*c*. Example electronic devices include, but are not limited to: laptop computers; desktop computers; cellular phones; tablet computing devices; and so on. It may be appreciated that a client device 102, such as described herein, can be implemented in any suitable manner.

In many embodiments, the processor 102*a* of the client device 102 can be configured to execute one or more software applications (each referred to as "client applications") stored, at least in part, in the memory 102*b*. Each respective client application can be instantiated by the processor 102*a*. In particular, the processor 102*a* may access a persistent memory (e.g., of the memory 102*b*) to retrieve one or more executable binary files and/or other computer-executable instructions (collectively, "assets"). The processor 102*a* thereafter can load at least a portion of the retrieved assets into a working memory (e.g., of the memory 102*b*), thereby at least partially instantiating the respective client application. For simplicity of description an implementation in which the client device 102 is configured to execute/instantiate a single client application is described below.

In embodiments, the software service 106 is configured to operate within or as a virtual computing environment that is supported by one or more physical servers including one or more hardware resources such as, but not limited to (or requiring) one or more of: a processor; a memory (also referred to as a working memory); non-volatile storage (also referred to as persistent memory); networking connections; and the like.

Specifically, it may be appreciated that although referred to as a singular "server", the software service 106 may be a cluster of different computing resources, which may be geographically separated from one another. In this manner, generally and broadly, both the software service 106 and the client device 102 can be referred to, simply, as "computing resources" that are communicably coupled to one another via a suitable network connection and via the gateway service 104.

As used herein, the term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices and systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As noted above, the software service 106 and the client application supported/executed by the client device 102 are communicably coupled via a suitable network connection which may be wired, wireless, or a combination thereof. In some examples, the network connection may include the open Internet.

In other cases, the network connection coupling the software service 106 and the client application may include only a private intranet managed by, or otherwise utilized by, an organization such as referenced above. The software service 106 and the client application can communicate according to any suitable protocol, form, or format. In many examples, the software service 106 at least partially exposes an API that can be accessed by the client application to perform one or more functions. For example, the client application may leverage the API to request structured data (such as described herein) from the software service 106.

For simplicity of description, the embodiments that follow reference a configuration in which the software service 106 and the client application are configured to communicate and transact information according to a REST API, but it may be appreciated that this is merely one example and in other embodiments other signaling, communication, or data transaction methodologies may be used.

The software service 106 of the system 100 can be configured and/or implemented in a number of suitable ways. For example, in many embodiments the software service 106 can leverage physical and/or virtual resources allocated to it to instantiate any suitable number of discrete subservices or purpose-configured modules, containers, virtual or physical networks, or virtual machines each configured to perform, coordinate, host, serve, or otherwise provide one or more services, functions, or operations of the software service 106, such as the gateway service 104.

The gateway service 104 can be hosted by a virtual machine or container executing over physical or virtual resources of the software service 106; collectively the physical and/or virtual resources allocated to instantiate the gateway service 104 are identified in the figure as the resource allocation(s) 104*a*. As with other embodiments described herein, the resource allocation(s) 104*a* can include, but may not be limited to (or may not require) one or more of: a processor; a memory; non-volatile storage; networking connections; and the like.

For example, in many constructions, the gateway service 104 is implemented in whole or in part as a software instance. The software instance defining the gateway service 104 may be instantiated by a processor among the resource allocation(s) 104*a*. In particular, the processor may access a persistent memory to retrieve executable binary files and/or other computer-executable instructions (collectively, "assets"). The processor thereafter can load at least a portion of the retrieved assets into a working memory, thereby at least partially instantiating the gateway service 104.

In some embodiments, the gateway service 104 may be provided as a serverless function (e.g., a lambda function), may be provided as a reverse proxy, may be provided as a router or as any suitable software and/or hardware appliance configurable to communicably couple at least to the client device 102 and to service requests for information therefrom, such as requests for structured data such as described herein. In other implementations, such as illustrated, the gateway service 104 may be executed/instantiated separately from the software service 106 altogether.

As noted with respect to other embodiments described herein, the gateway service 104 can be configured to receive requests and serve responses specifically related to structured data stored by the software service 106 and requested by the client device 102 and/or a client application executed and/or instantiated by the processor 102a of the client device 102.

For example, an example software service is an issue tracking system service. In this example, structured data may be a task list attributed to, or otherwise associated with, a particular user of the issue tracking system service. At some instant, the user may operate the client device 102 to initiate an API request 108 intended to be received by the issue tracking system service to retrieve the task list. In this example, the gateway service 104 interposes the issue tracking system service and the client application, routing the request for structured data originating from the client application to the issue tracking system service or, more particularly, to a database or database management system of the issue tracking system service. Thereafter, the gateway service 104 can submit an API response to the client device 102 containing the requested data merged as a single API response.

In another example, an example software service is a social media service. In this example, structured data may be a profile page attributed to, or otherwise associated with, a particular user of the social media service. As with preceding examples, at some instant, the user may operate the client device 102 to initiate an API request 108 intended to be received by the social media service to retrieve the requested profile page. As with previous examples, the gateway service 104 interposes the social media service and the client application executing on the client device 102. The gateway service 104 reroutes the API request 108 for structured data originating from the client application to the social media service or, more particularly, to a database or database management system of the social media service. Thereafter, the gateway service 104 can submit an API response to the client device 102 containing the requested data merged as a single API response.

In another example, an example software service is a collaborative software development environment. In this example, structured data may be a code repository or branch attributed to, or otherwise associated with, a particular project of the collaborative software development environment. As with preceding examples, at some instant, the user may operate the client device 102 to initiate an API request 108 intended to be received by the collaborative software development environment to retrieve the requested code repository or branch. As with previous examples, the gateway service 104 interposes the collaborative software development environment and the client application executing on the client device 102. The gateway service 104 reroutes the API request 108 for structured data originating from the client application to the collaborative software development environment or, more particularly, to a database or database management system of the collaborative software development environment. Thereafter, the gateway service 104 can submit an API response to the client device 102 containing the requested data merged as a single API response.

In another example, a software service may be a project management service. In this example, structured data may be a set of documentation detailing one or more projects attributed to or otherwise associated with a particular user of the project management service. At some instant, the user may operate a graphical user interface rendered on the display 102c by the client application to initiate a request intended to be received by the project management service to retrieve the set of documentation detailing a selected project. In this example, as with others described herein, the gateway service 104 interposes the project management service and the client application, routing the request for structured data originating from the client application to the project management service after which the gateway service 104 can forward a response back to the client device/client application for further processing and/or display.

In further examples, as described above, the system 100 may include a number of discrete software services which may or may not be supplied by the same vendor and/or may or may not be configured to the same or related purposes. In these examples, the gateway service 104 can be configured to service requests for structured data from an issue tracking system service, a project management service, an issue tracking service, a directory service, an email service, a telephony service, and a code repository service—each of which may define an environment in which a user of that service can create and consume structured data. In these examples, as may be appreciated, the gateway service 104 can be configured to route each respective request from the client application to each appropriate intended recipient/endpoint service. In particular, structured data requests related to messaging are routed to the issue tracking system service, structured data requests related to email are routed to the email service, structured data requests related to telephony are directed to the telephony service, and so on. Each of these requests can, in some examples, result in a merged response to the client device 102.

More generally, it may be appreciated that a user or operator in these foregoing examples may operate a client application to obtain or to submit structured data with the assistance of, or within an environment defined at least in part by, a respective one software service. In other words, it may be appreciated that a client application as described herein is understood to be typically specifically configured to operate with a particular software service as described herein. In other cases, a single client application may be configured to operate with multiple software services in order to aggregate information obtained from those software services into a single user interface for both convenience and benefit of the user.

For example, a project management service may be associated with a project management client application. In this example, the user can use the project management application to access the project management service which, in turn, defines an environment in which the user can use the client application to generate structured data related to, and relevant for, project management purposes.

In another example, an issue tracking service may be associated with an issue tracking client application. The user can use the issue tracking application to access the issue tracking service which, in turn, defines an environment in which the user can use the client application to create or consume structured data related to, and relevant for, issue tracking purposes.

In another examples, a dashboard application may be associated with, and configured to access both an issue tracking application and a project management application. Phrased in another non-limiting manner, a single client dashboard application may be configured to submit API requests to both an issue tracking service and a project management service and, additionally, to display information obtained from both services in a single user interface.

In view of the foregoing examples, it may be appreciated that, generally and broadly, a client application, such as described in reference to the client device 102 and executed or instantiated by a processor of the client device 102, may be purpose configured to communicate with any number of software services. More specifically, a client application may be configured to communicate with any suitable software service according to a particular API defined by that particular software service. In the illustrated example, a single example software service is illustrated with which the client application(s) instantiated by the client device 102 may communicate. It may be appreciated, however, that this is merely one example; in other cases and further embodiments a single instance of a single client application executed over a single client device (such as the client device 102) can be configured to obtain and/or submit data to multiple software services, including the software service 106. However, for simplicity of description, the embodiments described herein are presented with reference to a single client application and a single software service; it may be appreciated that this is merely one configuration and that other architectures can be differently configured.

More generally and broadly, it is appreciated that, as with other computing resources described herein, a given software service with which a given client application is configured to communicate (such as the software service 106) can be hosted by a virtual machine or container executing over physical or virtual resources; collectively the physical and/or virtual resources allocated to instantiate the software service 106 are identified in the figure as the resource allocation(s) 106a. The resource allocation(s) 106a can include, but may not be limited to (or may not require) one or more of: a processor; a memory; non-volatile storage; networking connections; and the like.

In addition, as noted above, a gateway service as described herein, such as the gateway service 104, can be configured to validate, mutate, and/or otherwise individually modify certain fields of an API response generated in response to the API request 108. For example, as noted above, the gateway service 104 can be configured to receive from the client device an API request including multiple parts. For example, the API request 108 can include a payload 110 that includes an API request formatted and suitable for querying structured data from the software service 106. Additionally, the API request 108 can include a resolver identifier 112.

The resolver identifier 112 can be any suitable data item, set of executable instructions, pointer, or other memory structure or indicator that uniquely identifies a particular client-specified resolver that can be executed by the gateway service 104. The resolver identifier 112 can be, without limitation: a universally unique identifier; a globally unique identifier; an internet protocol address identifying a particular server or service; a media access control address identifying a particular server or service; executable code; a link to executable code; a local or remote lambda function; and so on. Any suitable data that can be leveraged by the gateway service 104 to perform a custom or specified function can be used.

In these embodiments, once the gateway service 104 receives the API request 108 and identifies that the API request 108 includes the resolver identifier 112, the gateway service 104 can reconfigure itself to leverage a resolver identified by the resolver identifier 112 for at least one field specified by the resolver identifier 112 or the payload 110.

For example, in one embodiment, the client device 102 transmits the API request 108 which includes a resolver identifier 112 that instructs the gateway service 104 to validate a "name" field as a Boolean value compared against a constant string. In another example, the API request 108 includes a resolver identifier 112 that instructs the gateway service 104 to submit a particular field of "address" to a third-party validation server which, in turn, may return a latitude and longitude. In yet another example, the client device 102 transmits the API request 108 which includes a resolver identifier 112 that instructs the gateway service 104 to apply a particular image filter to an image file obtained by the gateway service 104; in some cases the image filter may be provided by a third-party service.

It may be appreciated that the foregoing examples are not exhaustive; any suitable function may serve to validate, modify, format, or otherwise mutate or evaluate a particular field requested by the payload 110 of the API request 108. In response, the gateway service 104 is configured, as noted above, to aggregate all fields requested, and/or the results of all field resolvers (whether specified by the API request 108 or otherwise) into a single API response 116 that is returned to the client device 102.

These foregoing embodiments depicted in FIG. 1A and the various alternatives thereof and variations thereto are presented, generally, for purposes of explanation, and to facilitate an understanding of various configurations and constructions of a dedicated database system and an access control system (including a gateway), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 1B:
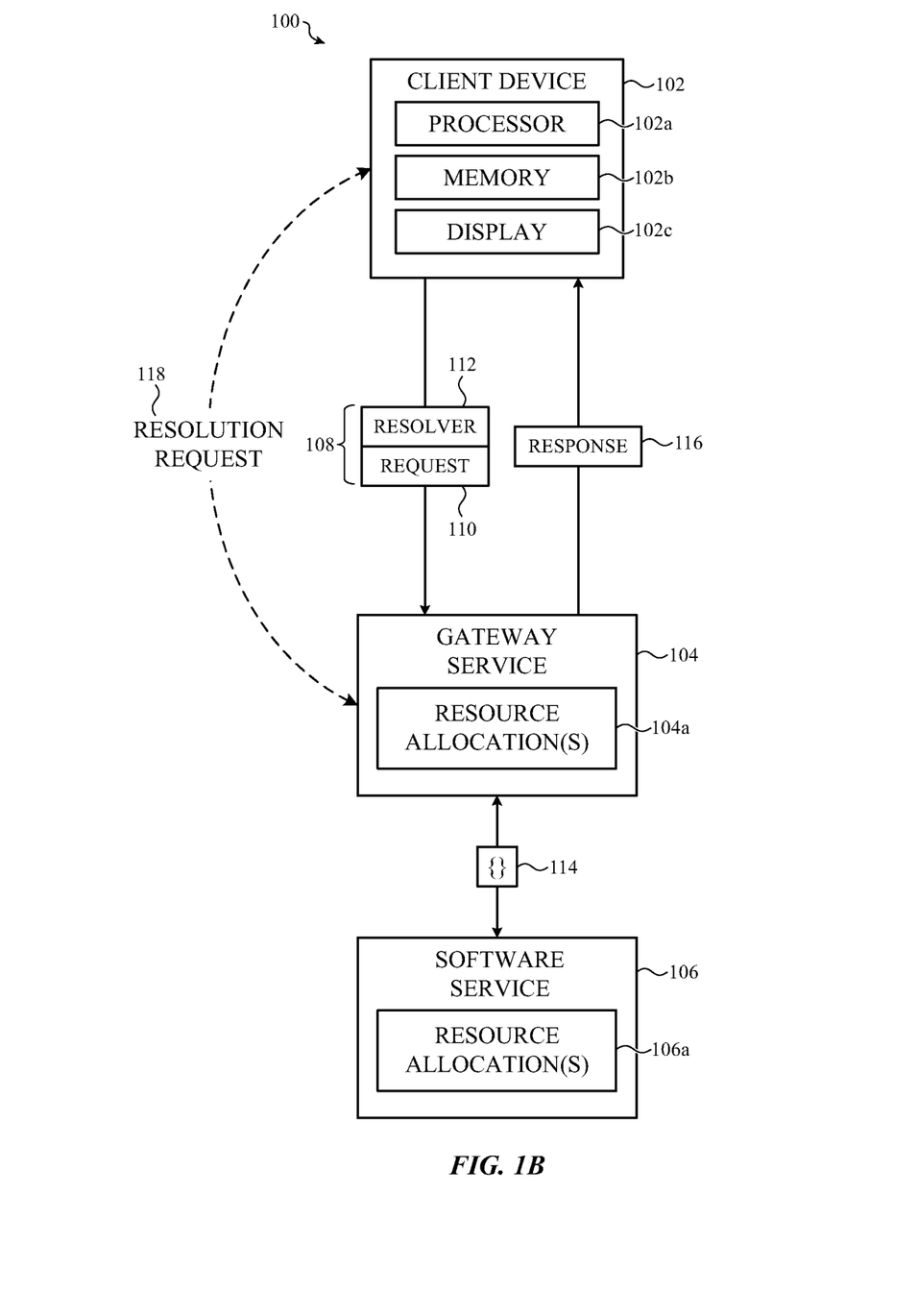
FIG. 1B depicts a simplified system diagram of the database language query gateway service of FIG. 1A configured to respond to a request from the client device, the request including a client-hosted and client-defined field resolver.

For example, it may be appreciated that a field resolver, and in particular the computing resource that performs the operations of a given client-defined field resolver, can be any suitable computing resource or hardware including the client device 102 itself. For example, as shown in FIG. 1B, in some embodiments, the API request includes a resolver identifier 112 that in turn instructs the gateway service 104 to submit a resolution request 118 back to the client device 102 itself. Once the client device 102 returns a result of the field validation, mutation, or other operation, the gateway service 104 can include the result returned form the client device 102 into the API response 116.

Figure 1C:
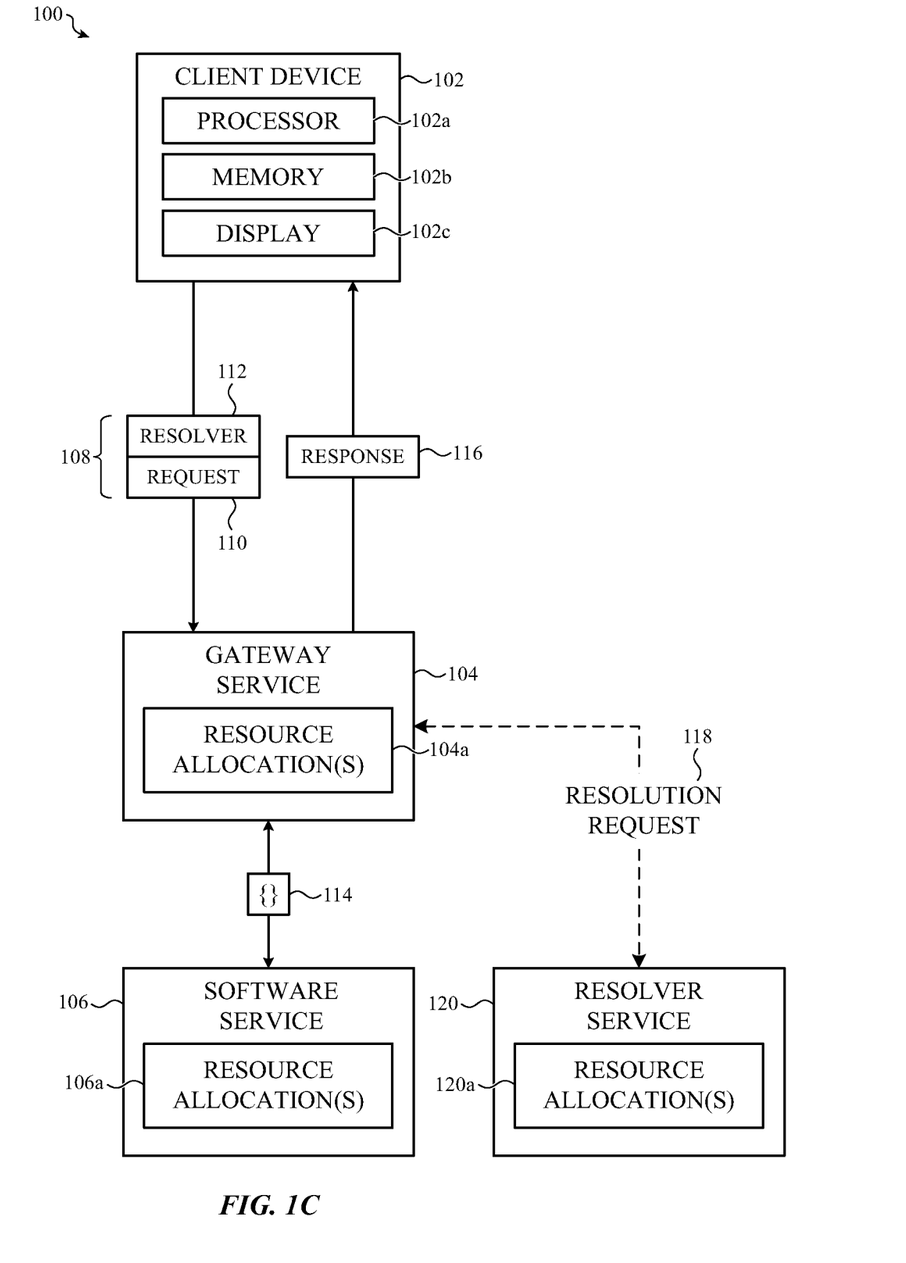
FIG. 1C depicts a simplified system diagram of the database language query gateway service of FIG. 1A configured to respond to a request from the client device, the request including a client-defined field resolver identifying or otherwise specifying a resolver service.

In yet other examples, a third-party service may be used to perform a field resolution operation. For example, as shown in FIG. 1C, in some embodiments, the API request 108 includes a resolver identifier 112 that in turn instructs the gateway service 104 to submit a resolution request 118 to a separate server, such as the resolver service 120 (which as with other computing resources described herein can be supported by one or more computing resource allocations, identified as the resource allocation(s) 120a). Once the resolver service 120 returns a result of the field validation, mutation, or other operation, the gateway service 104 can include the result returned from the client device 102 into the API response 116.

These foregoing embodiments depicted in FIGS. 1A-1C and the various alternatives thereof and variations thereto are presented, generally, for purposes of explanation, and to facilitate an understanding of various configurations and constructions of a dedicated database system and an access control system (including a gateway), such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that generally and broadly, a gateway service as described herein can be configured in any suitable manner to offload a particular field resolver operation to a third-party service, to a client device, to a specific string of executable code, or in any suitable manner. As a result, more generally and broadly, it may be appreciated that a gateway service as described herein can receive and service API requests that include (or reference) at least one custom, client-defined or user-defined field resolver.

Figure 2:
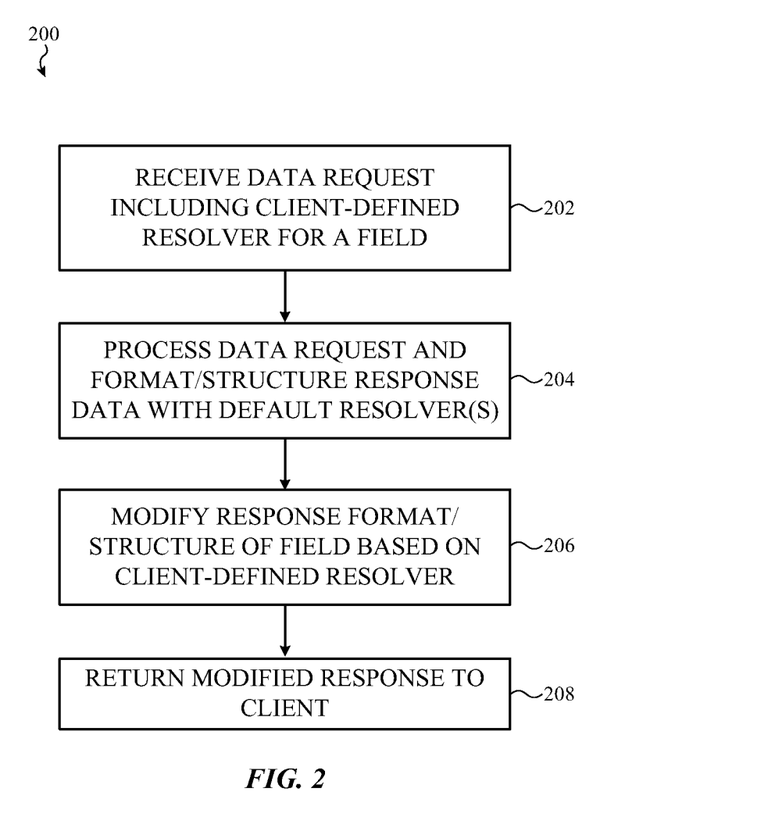
FIG. 2 is a flowchart depicting example operations of a method of servicing a data request including a client-defined field resolver with a database language query gateway service, such as described herein.
Figure 3:
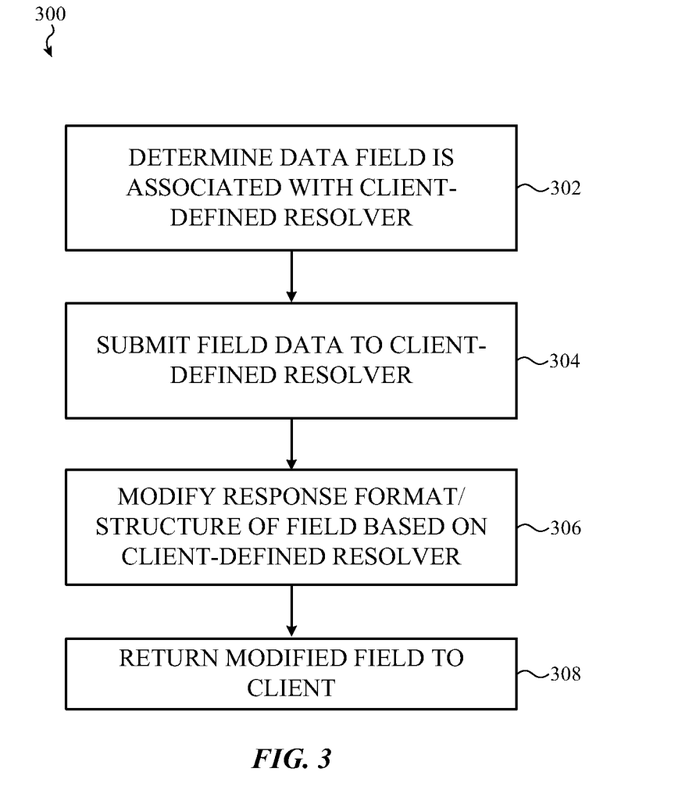
FIG. 3 is a flowchart depicting example operations of another method of servicing a data request including a client-defined field resolver with a database language query gateway service, such as described herein.

Generally and broadly FIGS. 2-3 depict flowcharts that include example operations of methods of operating a gateway service as described herein. Each of these depicted methods can be performed in whole or in part by a computing resource, a resource allocation, a processor, or any other suitable virtual or physical hardware or software combination such as described herein. It may be appreciated that these methods may be performed in part by a first system and in part by a second system in some implementations.

FIG. 2 is a flowchart depicting example operations of a method of servicing a data request including a client-defined field resolver with a database language query gateway service, such as described herein.

The method 200 includes operation 202 in which a data request or API request is received. The data request received at operation 202 includes a client-defined field resolver, such as described above. In some cases, the client-defined field resolver can be an identifier (e.g., string, integer, universally-unique identifier, globally unique identifier, and so on), can be executable code, and/or can be an address such as an IP address or a MAC address.

The method 200 further includes operation 204 in which the data request/API request is processed. As described above, this operation may be performed by determining a set of queries that may be applied to one or more databases or database systems of a software service to obtain the data requested by the API request. The operation 204 can advance to assemble a single API response with one or more results of the queries or transactions generated in response to receiving the API request at operation 202. In many cases, one or more fields of the API response may be validated, mutated, or otherwise changed by leveraging a default or otherwise predefined field resolver.

Thereafter, the method 200 advances to operation 206 at which at least one portion of the API response is modified based on an output of the client-defined field resolver obtained at operation 202. In some cases, a field value obtained from a default resolver may be overwritten by an output of a client-defined field resolver. In other cases, validation/mutation/modification of a particular field may be skipped at operation 204 such that the value can be filled by operation of the client-defined field resolver at operation 206 of the method 200.

At operation 208, the method 200 advances to return the modified API response to the client device that initiated the original API request.

FIG. 3 is a flowchart depicting example operations of another method of servicing a data request including a client-defined field resolver with a database language query gateway service, such as described herein.

The method 300 includes operation 302 at which a gateway service as described herein determines that at least one field of a received API request is associated with a client-defined or otherwise custom (non-runtime) resolver.

Thereafter at operation 304, the method 300 advances to submit field data obtained by querying a database of a software service to the client-defined field resolver. As noted with respect to many embodiments described herein, the field resolver may be local to the client device, may be a third-party service, or may be executable code executed by the gateway service. Many configurations or architectures are possible.

Thereafter, the method 300 advances to operation 306 at which at least a portion of an API response generated by the gateway service is modified based on an output of the client-defined field resolver.

Finally, at operation 308, the methods 300 advances to return the modified API response to the client device that initiated the original API request.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

Further, many foregoing examples and descriptions of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first- or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed or aggregated only for legitimate, agreed-upon, and reasonable uses.

What is claimed is:

1. A database language query gateway communicably coupled to a client application instantiated by operation of a client device and a software service instantiated by operation of a server, the database language query gateway comprising:
   a processor allocation; and
   a memory allocation storing executable instructions that when accessed by the processor allocation instantiate a gateway service configured to:
      receive, from the client application, an application programming interface (API) request, the API request comprising:
         a first portion comprising a first request for data stored in a database accessible to the software service; and
         a second portion comprising a link to a third-party server hosting executable code, the executable code executable by a third-party resolver service the and configured when executed to receive as input at least one field requested by the first request;
      generate and transmit, based on the API request, an instruction to the software service to query the database;
      receive, from the software service, a first response to the instruction, the first response comprising the at least one field;
      generate, by the gateway service, a second request comprising the at least one field and the link to the third-party server;
      provide, by the gateway service, the second request as input to the third-party resolver service to cause the third-party resolver service execute the executable code to resolve the at least one field in a manner defined by the executable code;
      receive, by the gateway service, a second response from the third-party resolver service;
      generate an API response, the API response combining the second response received from the third-party resolver service and the first response received from the software service; and
      provide the API response to the client application.

2. The database language query gateway of claim 1, wherein:
   the database is a first database;
   the at least one field is a first field; and
   the gateway service is configured to:
      generate, based on the API request, at least one query of a second database of the software service;
      receive, from the database of the software service, a third response to the at least one query of the second database, the third response comprising a second field of the data requested from the database; and
      generate the API response, the API response comprising the second field.

3. The database language query gateway of claim 2, wherein generating the API response further comprises:
   generating a third request comprising the third response and the second portion;
   providing the third request as input to the third-party resolver service to cause the third-party resolver service to execute the executable code against the third request; and
   receiving a fourth response from the third-party resolver service.

4. The database language query gateway of claim 1, wherein the executable code identifies the at least one field.

5. A client-server system for servicing API requests, the system comprising:
   a software service instantiated by a first server and comprising at least one database;
   a resolver service instantiated by a second server separate from the first server;
   a client device comprising a first processor allocation executing a client application, the client application configured to generate an API request comprising:
      a first request for data stored in the at least one database of the software service; and
      a client-defined link to a third-party server storing executable code, that when retrieved by the resolver service is:
         executable by the resolver service; and
         configured to receive as input at least one field of the data requested from the at least one database; and
   a query gateway instantiated on a third server separate from the first server and the second server, the query gateway comprising a second processor allocation executing a a gateway service, the gateway service in communication with the client application and the software service and configured to:
      receive the API request from the client application;

generate at least one query of the at least one database of the software service based on the first request for data;

cause the software service to execute the at least one query against the at least one database;

receive, at the gateway service from the software service, a first response comprising the at least one field;

generate, by the gateway service, a second request comprising the at least one field and the client-defined link;

provide the second request as input to the resolver service to cause the resolver service retrieve the executable code at the client-defined link and thereafter to execute the executable code against the at least one field;

receive, at the gateway service, a second response from the resolver service the second response comprising an output of the executable code;

generate an API response comprising the second response; and communicate the API response to the client application.

6. The system of claim 5, wherein the client application is configured to:

generate the API request in response to receiving an input to a graphical user interface; and update the graphical user interface in response to receiving the API response.

7. The system of claim 5, wherein the API request identifies the at least one field.

8. The system of claim 5, wherein the executable code modifies or reformats the at least one field.

9. A method of operating a database language query gateway service, the method comprising:

receiving, from a client application executing on a client device, an API request;

extracting from the API request a first request for data and a client-defined link to a third-party service storing executable code that, when retrieved, is executable by a resolver service separate from the database language query gateway service, the executable code configured to receive as input at least one field of the first request for data;

generating at least one query responsive to the first request for data;

executing the at least one query against at least one database of a software service communicably coupled to the database language query gateway service;

receiving a first response of the at least one query from the at least one database, the first response comprising the at least one field;

generating, by the database language query gateway service to the resolver service, a second request comprising the at least one field and the executable code;

receiving a second response from the resolver service, the second response comprising a result of execution by the resolver service of the executable code against the at least one field;

generating an API response including the second response; and communicating the API response to the client application.

10. The method of claim 9, wherein further comprising:

providing the second request as input to a client-defined resolver comprises submitting a resolution request to the resolver service, the resolution request comprising the executable code.

11. The method of claim 9, wherein the executable code modifies the at least one field.

12. The method of claim 9, wherein the executable code modifies a format of the at least one field.

* * * * *